Sept. 12, 1933.   E. J. STODDARD   1,926,463
APPARATUS FOR OBTAINING POWER FROM COMPRESSED AIR
Original Filed July 18, 1923
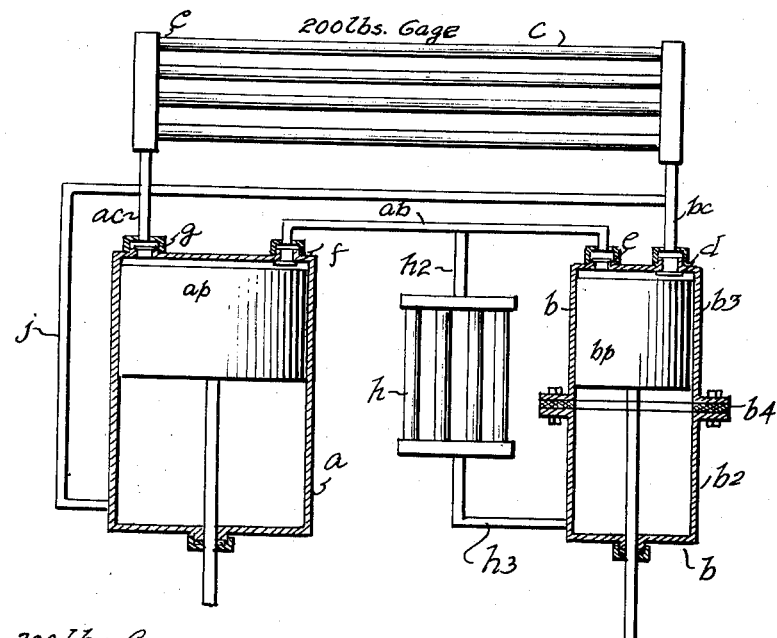
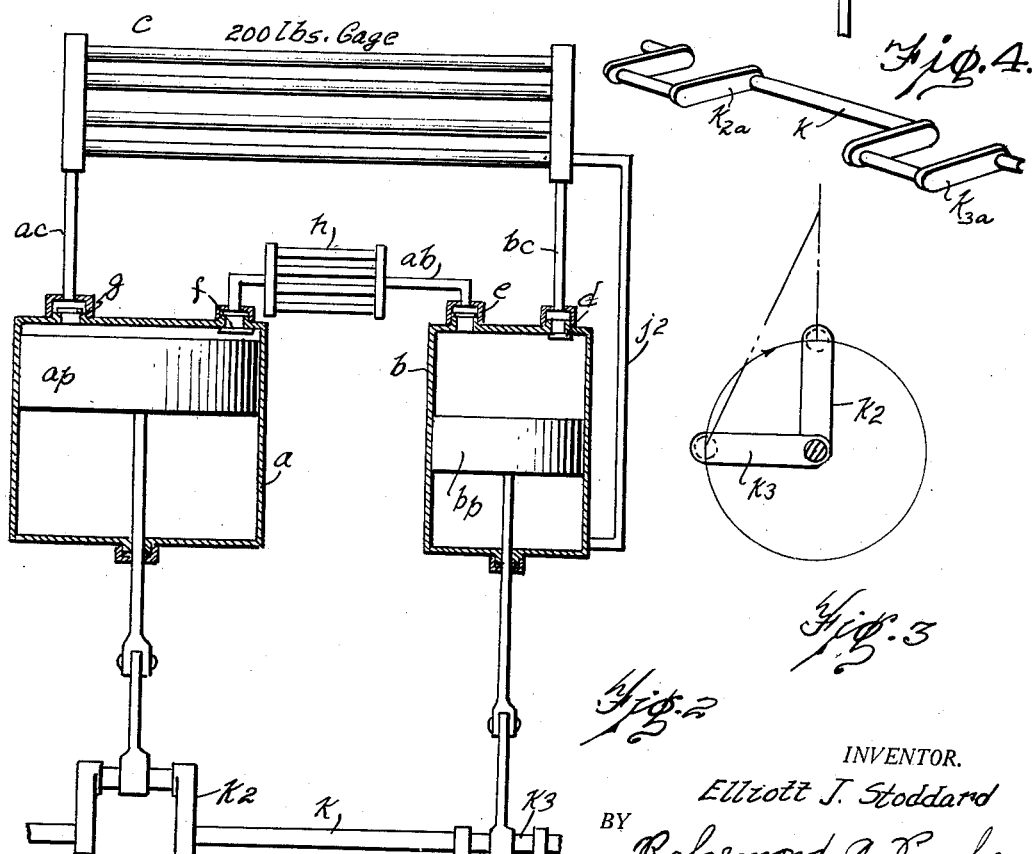
INVENTOR.
Elliott J. Stoddard
BY
Ralzemond A. Parker
ATTORNEY.

Patented Sept. 12, 1933

1,926,463

UNITED STATES PATENT OFFICE 1,926,463

APPARATUS FOR OBTAINING POWER FROM COMPRESSED AIR

Elliott J. Stoddard, Highland Park, Mich.

Application July 18, 1923, Serial No. 652,225
Renewed April 15, 1932

3 Claims. (Cl. 60—59)

My invention relates to an apparatus for obtaining power from compressed air.

In the accompanying drawing:—

Figure 1 is a diagrammatic representation of the apparatus embodying my invention.

Figure 2 is a modified form of the apparatus of Figure 1.

Figure 3 is a detail showing the relative position of the cranks of the apparatus of Fig. 2.

Figure 4 is a detailed perspective view of the crankshaft of Figure 1, showing the relative positions of the cranks.

$a$ is the working cylinder having the piston $ap$ and $b$ is an auxiliary cylinder having the piston $bp$ adapted to reciprocate therein.

The cylinder $b$ is made up of two parts, the upper $b3$ being united by a conventional flange to the lower, $b2$, with a heat insulating washer $b4$ between said flanges.

The pistons $ap$ and $bp$ may be connected to the same crankshaft as shown in Figure 2 illustrating a modified construction.

The cylinder $b$ is of less diameter than the cylinder $a$ so that the piston $bp$ will have an area of perhaps half that of $ap$.

$c$ is a cooling reservoir preferably of such internal capacity that the operation of the engine shall not vary the pressure therein to a substantial extent, and the passages between the cylinders should be of as small internal volume as practicable so as not to introduce objectionable clearance. The reservoir $c$ is shown as made up of tubes, the ends of which are connected to headers and water may be used in the usual way around the tubes for cooling the same.

$d$ is an inlet and $e$ a discharge valve at the upper end of the cylinder $b$, and $f$ is an inlet and $g$ a discharge or exhaust valve at the upper end of the cylinder $a$.

$bc$ is a pipe or conduit leading from the cooler $c$ to the cylinder $b$ through the port of the valve $d$. $ab$ is a pipe or conduit connecting the cylinders $a$ and $b$ to the intake port $f$ of the cylinder $a$. $ac$ is a pipe or conduit connecting the cylinder $a$ with the reservoir $c$ through the port of the exhaust valve $g$. $j$ is an open pipe connecting the reservoir $c$ with the lower end of the cylinder $a$.

$h$ is a heater. This is represented conventionally as two headers joined by pipes. $h2$ is a pipe leading from the pipe $ab$ to the upper end of the heater $h$ and $h3$ is a pipe leading from the lower end of the heater $h$ to the lower end of the cylinder $b$.

The valves $d$, $e$, $f$, $g$, are preferably mechanically controlled but as valve-controlling mechanism is conventional and well understood the details are not shown and conventional automatic valves may be used.

The operation of the form of the device shown in Fig. 1 is as follows:—

The reservoir $c$ and connecting passages are filled with compressed air at a high pressure, say 200 pounds gauge. When the piston $bp$ descends air is drawn from the reservoir $c$ to fill the cylinder $b$ above said piston. When the piston $bp$ begins to rise the valve $d$ is closed and the valve $e$ opened and the air above the piston $bp$ is passed through the port of the valve $e$, conduits $ab$ and $h2$, into the heater $h$, where it is heated to a high temperature and then passed through the pipe $h3$ to the lower end of the cylinder $b$. It will be observed that the pressure on both sides of the piston $bp$ during this operation is the same but that the air is held at constant volume and is heated by being passed through the heater $h$.

When the piston $bp$ is at the upper end of its stroke the piston $ap$ is also at this end of the stroke, the cranks being parallel as shown at $K2a$ and $K3a$, Figure 4. The valve $e$ is now closed and the valve $f$ opened and the piston $ap$ descends on its working stroke, the air passing from below the piston $bp$, again through the heater $h$ and acting upon the greater area of the piston $ap$ to produce the working stroke. When the piston $ap$ has reached the lower end of its stroke the valve $f$ is closed and the valve $g$ opened, and as said piston rises it discharges the air above it through the pipe $ac$ into the cooler $c$ where the remaining heat is removed.

In the apparatus of Fig. 2 the parts are mainly the same as in Fig. 1 and are lettered the same, the difference being that the port of the valve $e$ is connected directly to the port of the valve $f$ with the heater $h$ interposed in the conduit $ab$ and the pistons $ap$ and $bp$ are in different phases. I have shown the piston $bp$ as 90 degrees behind the piston $ap$. In Fig. 2 the lower end of the cylinder $b$ is connected with the reservoir $c$ by an open pipe $j2$.

$k$ indicates the crankshaft; $k2$ the crank connected to the piston $ap$, and $k3$ the crank connected to the piston $bp$. The operation of the form of the device shown in Fig. 2 is as follows:—

The compressed air is taken in past the valve $d$ on the descending stroke of the piston $bp$. The piston $bp$ then rises and compresses the air above it to a still higher pressure, in this instance, to about half of its stroke. The piston $ap$ is then at the top of the stroke and beginning to descend. The valves e and f are now open and the air compressed above the piston bp is passed through the conduit ab and heater h, wherein it is raised to a higher temperature and into the cylinder a above the piston ap, acting upon the greater area of surface of said piston. When the piston bp has reached the top of its stroke the valves e and f are closed and the compressed air above the piston ap is allowed to expand. When the piston ap again rises it discharges the air above it through the exhaust port g and passage ac to the cooler c, where its heat is removed.

It is to be noted that the increase in pressure at the end of the up stroke of the piston bp, is due to the rise in temperature and not to mechanical work and that the increased pressure of the air due to its heating between the cylinders has caused no additional work as the expansion cylinder is also the balancing cylinder.

What I claim is:—

1. The combination of a reservoir c having cold air under pressure therein, a cylinder b closed at both ends having a reciprocating piston therein and having its intake port at one end connected to said reservoir and its exhaust port at said end connected to the intake port of the other end, a working cylinder a, with a reciprocating piston therein the exhaust from the last named end of the cylinder b communicating with the intake of the cylinder a so as to transfer said portion of air to said working cylinder at each stroke, means for heating the air in the connection between the ends of the first mentioned cylinder, the exhaust of the cylinder a leading to the reservoir c, said pistons being operatively connected.

2. The combination of a reservoir of cold compressed air at a high pressure, a cylinder with a piston adapted to reciprocate therein, a second cylinder with piston adapted to reciprocate therein, the intake of the first cylinder communicating with said reservoir and its outlet communicating with the intake of the second cylinder, said pistons being connected and so arranged that the pressures thereon shall balance each other, said cylinders being of such a capacity that the air passing between them shall be held at approximately constant volume, a heater for the air passing from one of said cylinders to the other, and a working cylinder adapted to receive the heated air from the second cylinder, expand the same and return it to said reservoir.

3. The combination of a reservoir of cold compressed air at a high pressure, a cylinder with a piston adapted to reciprocate therein, a second cylinder with a piston adapted to reciprocate therein, the intake of the first cylinder communicating with said reservoir and its outlet communicating with the intake of the second cylinder, said cylinders being of such a capacity that the air passing between them shall be held at approximately constant volume, a heater for the air passing from one of said cylinders to the other, and a working cylinder adapted to receive the heated air from the second cylinder, expand the same and return it to said reservoir.

ELLIOTT J. STODDARD.